July 22, 1969        G. A. TINNERMAN        3,456,705
GROOVE CUTTING ROTATING FASTENER Filed Aug. 1, 1966        2 Sheets-Sheet 1

INVENTOR.
GEORGE A. TINNERMAN
BY

July 22, 1969   G. A. TINNERMAN   3,456,705
GROOVE CUTTING ROTATING FASTENER
Filed Aug. 1, 1966   2 Sheets-Sheet 2

INVENTOR
GEORGE A. TINNERMAN

BY
ATTORNEY

3,456,705
GROOVE CUTTING ROTATING FASTENER
George A. Tinnerman, 17864 Beach Road,
Lakewood, Ohio 44107
Filed Aug. 1, 1966, Ser. No. 569,478
Int. Cl. F16b 39/22, 37/00, 27/00
U.S. Cl. 151—38          2 Claims

ABSTRACT OF THE DISCLOSURE

A sheet metal nut element for cutting a groove or thread channel on a smooth shank is formed with a plurality of teeth on the peripheral edge of an aperture which receives a stud. The periphery of the aperture is interrupted by breaks or discontinuities and each tooth is formed by an angle at the intersection of the peripheral edge and the edge of a discontinuity. The edge between the discontinuities is deflected axially so that the teeth and adjoining edge lie on a helical curve to cut a single groove in the shank.

---

In other forms, tapered interrupted threads may be used and a washer with sealing compound is swiveled on the nut.

My invention relates to a fastener in which one of two relatively rotatable members extends through an aperture in the other, and the two members are secured together by teeth on the apertured member which cut threads in the surface of the other member. The apertured member may be a nut or equivalent and the member projecting through the aperture is usually in the form of a stud or shank.

Some types of fasteners are already known in which the nut or similar element forms its own thread on an unthreaded rod or stud, but these have disadvantages because of size, either radially or axially of the stud. It is also difficult in many of these fasteners to align the nut properly on the stud due to "rocking" of the nut about its points of engagement, so that extreme care is required of the operator to maintain alignment.

It is therefore one of the objects of this invention to construct a fastener which preferably is made of suitable sheet material and which is provided with means for cutting a groove or thread channel in an unthreaded stud or the like during relative rotative movement between the fastener and the stud.

Another object is a fastener of the type disclosed herein which is provided with a plurality of substantially radially disposed multiple cutting means arranged at three or more points in an opposed fashion about a stud or shank receiving opening in the fastener for thread channel cutting engagement therewith.

A further object is a multi-toothed thread cutting fastener formed of a relatively stiff sheet material which is self aligning with respect to the axis of the stud or shank on which it is applied.

Another object of the invention is a structure which is adapted to the economical use of pre-hardened and pre-finished materials, thereby eliminating costly hardening and tempering operations.

Still another object is a relatively thin walled fastener of stiff sheet material having a stud receiving opening therein and provided with at least three stud engaging thread cutting means arranged along a helical path about the opening.

Still another object is to provide a multi-toothed thread cutting fastener by which a continuous single groove or thread channel may be formed along the stud permitting the associated parts to be drawn tightly together in clamped assembled position.

Another object of my invention is the formation of a fastener with axially spaced thread channel cutting elements circumferentially arranged at progressively decreasing distances from the axis of rotation to form a single groove or thread channel by successive cutting of the cutting elements.

Another object is to connect rotatably a resilient washer to a groove cutting nut to exert resilient clamping pressure and simplify the handling by use of one assembly.

Other and further objects and advantages of this invention will become more apparent from the following description and claims, reference being made to the accompanying drawing which shows several embodiments of the present invention and the principles thereof, and in which drawing like reference characters are employed to designate like parts throughout the same.

Figure 3:
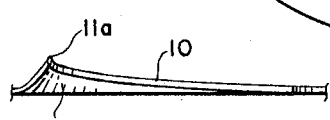
FIGURE 3 is a view looking in the direction of the arrows 3—3 of FIGURE 2 and illustrates one of the locating and positioning edges and its associated groove or thread channel cutting tooth.
Figure 4:
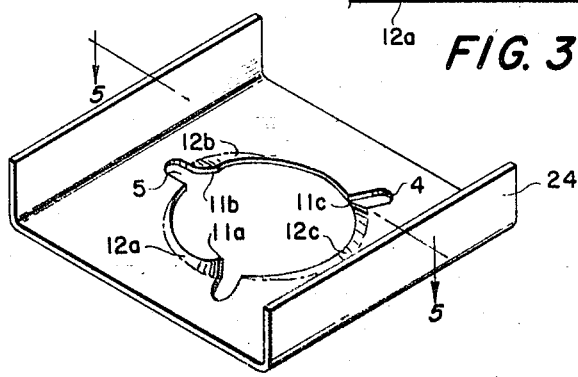
FIGURE 4 illustrates still another modified form of fastener embodying my invention.
Figure 5:
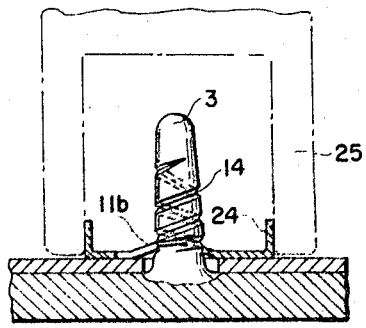
FIGURE 5 is a view partly in section as taken on line 5—5 of FIGURE 4, showing the fastener driven home on the stud by means of a wrench or other tool as a result of forming its own thread channel in the stud during such operation.

A fastener which illustrates specifically my invention as applied to a nut-like element which may be secured to a shank or stud is shown in FIGURES 1 to 5, in which the thread channel or groove forming structure are the same. The fastener 1 in FIGURE 1 has an aperture 2 to receive a stud 3 as shown in FIGURE 5. The periphery of this aperture 2 is interrupted or is discontinuous at three spaced points 4, the slots or notches 5 extending outwardly from the periphery bordered by the side edges 6, 7.

Figure 2:
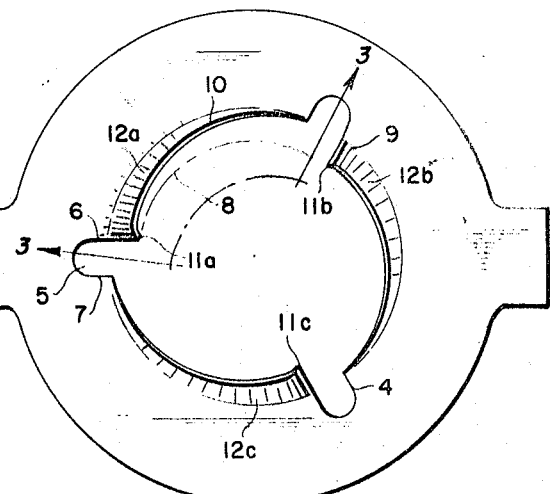
FIGURE 2 is a modified form.

As shown in FIGURE 2, the side edges 7 are shorter than the side edges 6, so that the inner ends of side edges 6 are closer to the axis of the aperture and lie substantially in a circle 8 of smaller radius than the inner ends of edges 7, which lie on the circle 9. The edge 10 of the aperture 2 connecting the inner end of one side edge 7 with the inner end of the side edge 6 of the adjacent notch 4 decreases in distance from the axis as will be seen in FIGURE 2, this edge terminating at side edge 6 in an inwardly directed tooth shown, for example, at 11a. As is best shown in FIGURE 3, this edge 10 of the aperture is deflected out of the plane of the circle 9, as at 12a, the tooth 11a extending above said plane and radially inwardly, while the edge 10 slopes from the plane of the circle 9 to the tooth 11a.

Shown in these figures are three notches or discontinuities 4 in the periphery of opening 2, and three arcuate edges 10 between these discontinuities. The three teeth 11a, 11b, 11c are not the same, but are at the end of unequally deflected portions 12a, 12b, 12c. The teeth lie in a helical curve, and each tooth is spaced axially from its adjacent tooth by one-third of the pitch distance of the helical groove to be formed in the stud when the element 1 is rotated on a stud. The edges 12a, 12b, 12c engage the stud 13 and with the three cutting teeth 11a, 11b, 11c maintain the nut element on the stud in axial alignment. The edges are so inclined that the grooves being cut by one tooth is engaged by the edge of the following tooth, so that the next tooth cuts deeper in the same groove, and the edges guide the teeth in cutting a single helical groove or thread channel 14, shown in FIGURE 5.

As each tooth contributes to cutting the groove, this groove or thread channel 14 will be deeper by the removal of on the order of three times as much material as one tooth would remove. As a result, the fastener 1 engages the stud 13 in a groove 14 substantially deeper than if the teeth formed separate grooves.

This fastener may be made from hardened steel, and the hardened cutting teeth are thus provided without necessity for subsequent hardening operation.

Figure 1:
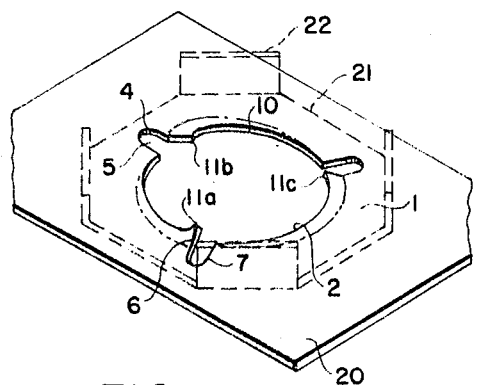
FIGURE 1 is a perspective view of a fastener embodying one form of my invention.

The forms of fastener shown in FIGURES 1 to 5 differ by the formations for manufacture and wrench engagement. In FIGURE 1, the strip 20 may be punched and formed by successive actions. The strip may then be cut and bent as shown by dotted lines 21 to provide wrench seats 22.

The element in FIGURE 2 is provided with tool engaging arms 23, while in FIGURES 4 and 5, flanges 24 provide for engaging of wrench 25. The stud 3 may be tapered as shown, and the single groove 14 is cut by the joint, successive action of the three cutting teeth.

Figure 6:
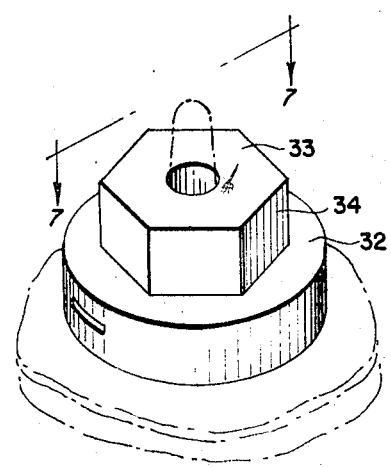
FIGURE 6 is a perspective view of a further modification of the invention wherein the fastener is enclosed within a molded body of suitable plastic material, the body being formed with tool engaging faces.
Figure 7:
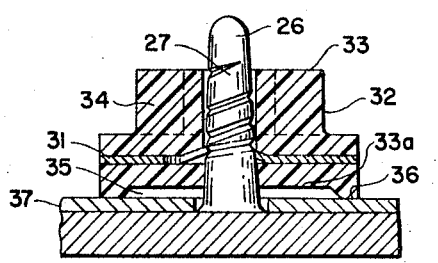
FIGURE 7 is a vertical section taken on line 7—7 of FIGURE 6.

The fastener or nut element having cutting teeth to cut a deep, single grove in a stud or shank may be incorporated in a rigid or semi-rigid plastic body to form a composite fastener. In FIGURES 6 and 7, the metal fastener element 31 has cutting teeth which are the same as those in FIGURES 1 to 5 and engage a stud 26 to cut a groove 27 in the stud. This metal fastener element is incorporated in a body 32 of plastic material of a rigid or semi-rigid type, which may be considered essentially rigid. This plastic body is similar to the nut body of the composite nut disclosed and claimed in the Tinnerman application, Ser. No. 549,880, filed May 13, 1966. In the form illustrated here, the metal fastener element 31 extends to the periphery on opposite sides of the plastic body, and is spaced from the opposite end faces 33, 33a of the body. The plastic body 32 has a polygonal 34 portion to operate as a wrench seat for rotating the composite fastener on the stud, and the lower or engaging face 32 of the plastic body is hollowed at 35, so that only a peripheral portion 36 engages initially the surface of a member 37 engaged by the fastener. As the fastener is tightened, the cutting teeth of the metal fastener element 31 will engage the grove 27 cut in the stud 3 to exert pressure on the plastic body, compacting the body against the stud and the member engaged, and distorting the hollow base, providing a resilient and liquid tight engagement. At the same time, the essentially rigid plastic body 32 will reduce distortion of the metal element 31, with resilient resistance to deflection of the metal components.

Figure 13:
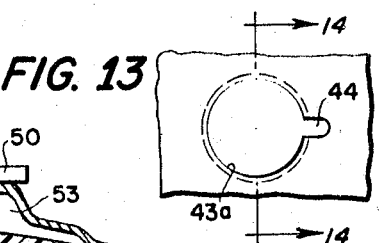
FIGURE 13 shows a modified form of aperture in the fastener of FIGURE 10.
Figure 14:
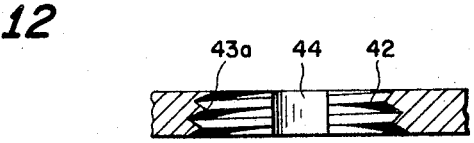
FIGURE 14 is an enlarged cross section on line 14—14 of FIGURE 13, showing the tapered threads in the apertures of FIGURES 9 and 13 in detail.
Figure 8:
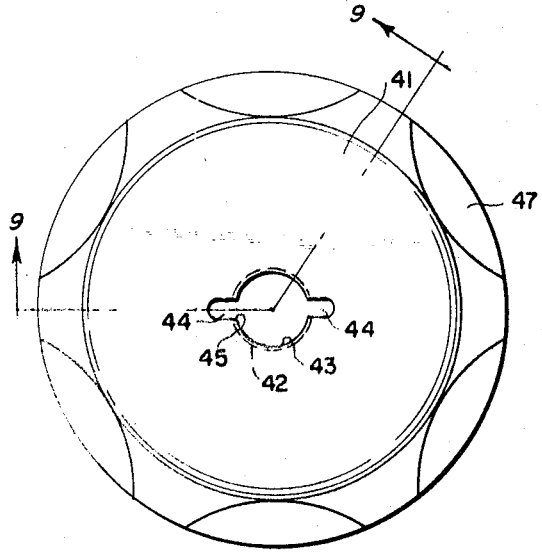
FIGURE 8 shows a plan view of another form of fastener for cutting the groove or thread channel in a stud.
Figure 9:
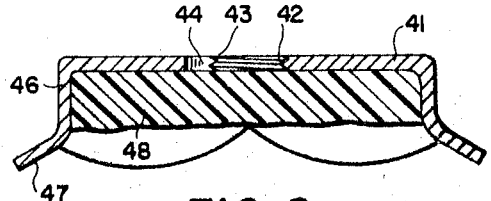
FIGURE 9 shows a cross section on line 9—9 of FIGURE 8.

Another form of fastener element is shown in FIGURES 8 and 9, in which the metal nut element 41 has teeth in the form of tapered, interrupted threads 42. The periphery of aperture 43 is interrupted by a plurality of notches or discontinuities 44, and the intermediate arcs are formed with the spiral threads 42 lying on a single spiral curve. These threads and the spiral curve decrease in diameter so that the thread first engaging the stud is of greater diameter than the next thread, as shown in FIGURE 14. The edges of the notches 44 intersect with the threads 42 to form corners or teeth 45, which will cut into the surface of a stud on which the fastener element is rotated. The edges of the threads will engage in the groove cut by the teeth 45, and as these threads lie in a single spiral curve, the teeth will cut a single groove, and as shown in FIGURE 13 such thread formation may be incorporated along with but a single interruption 44.

This nut element of sheet material is formed with an axially extending, flange 46 and a flared skirt 47 within which is confined mastic compound 48. The flared skirt provides resilience as the element is tightened on a stud, while the mastic forms a tight seal with the member engaged by the fastener.

Figure 11:
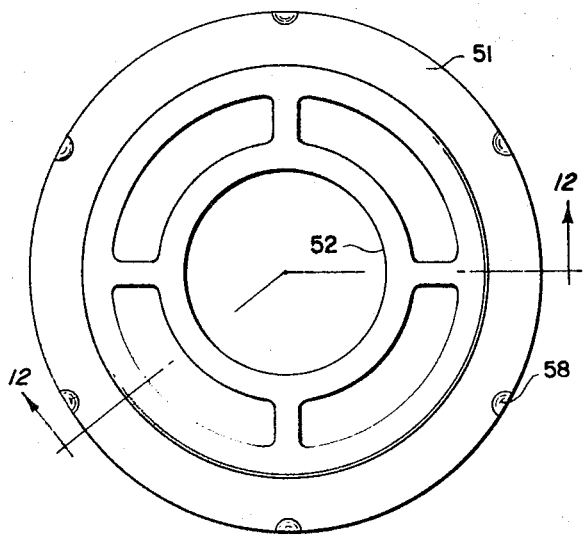
FIGURE 11 shows a plan view of a washer to be used with the fastener of FIGURE 10.
Figure 10:
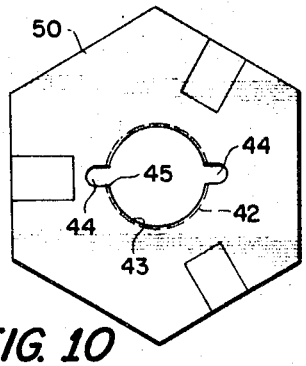
FIGURE 10 shows a plan view of another form of fastener.
Figure 12:
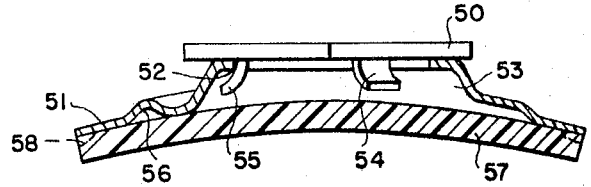
FIGURE 12 shows the fastener and washer assembled, with the washer in section on line 12—12 of FIGURE 11.

The nut element may also have a washer element formed separately, as shown in FIGURES 10, 11 and 12. The polygonal nut element 50 is formed from flat sheet material, and the aperture 43 has threads 42 of the same construction as shown in FIGURES 8 and 9. A washer element 51 of hardened, resilient thin metal is carried by the fastener element for clamping against a member engaged by the fastener assembly. The washer 51 is curved with the convex side toward the nut element, and the periphery of the aperture 52 is pressed above the surface to form an annular recess 53. Legs 54 are cut and struck out of the nut element 50, to extend axially through the aperture 52 with their ends 55 extending outwardly into the recess 53, so that the nut may rotate freely as the washer is clamped, but the two elements remain assembled when not in use. The washer also has channels 56 stamped therein to act as reenforcing ribs, so that the material may be thin and resilient, and have sufficient strength. A mastic compound 57 forms a sealing layer on the washer, and the small depressions or teeth 58 in the edge of the washer maintain the mastic body in position.

The nut element, washer and mastic body constitute a fastening, clamping and sealing assembly, so that only one member is handled. The nut cuts threads in a shank when rotated, and the washer exerts resilient clamping pressure, the mastic body forming a liquid tight seal between the stud and the engaging element. This washer may be adapted to use with any forms of the nut shown, such as that of FIGURE 1 with the cutting teeth arranged on the edge of the periphery of the opening.

The aperture in the fasteners of FIGURES 8 and 11 may also be formed with only one interruption or notch 44, as illustrated at 43a in FIGURE 13. FIGURE 14 shows the aperture 43a in cross section on an enlarged scale, which illustrates the tapered formation of the cutting threads, as used in the fasteners of FIGURES 8, 10 and 13.

The specific examples of my invention described herein are intended to illustrate the invention which contemplates various modifications within the spirit and scope of the disclosure.

What I claim is:

1. A groove cutting fastener and washer assembly in which said fastener is formed of generally flat sheet material having an opening therethrough formed to cut a groove formation in a smooth surface stud when rotated thereon, the periphery of said opening being formed in arcuate segments spaced by discontinuities in the periphery, each arcuate segment terminating at an intersection with the edge of a discontinuity to form a groove cutting tooth, said washer being swiveled to said fastener for relative rotation by a plurality of legs, each struck out from the sheet material of said fastener between a pair of slits extending inwardly from the outer periphery of said fastener, said material between each pair of slits projecting axially and turned radially outwardly to form an outwardly extending end of a leg spaced from the plane of said fastener, said washer being curved with its convex side toward said nut and including a raised central portion having an aperture to provide an annular recess thereunder, said legs of said nut extending through said aperture with said ends in said recess to prevent separation of said nut and washer while allowing relative rotation, said washer having a radially extending flange connected to the curved portion surrounding said recess to maintain sealing material spaced from said fastener under said washer and in contact with said stud, while allowing said fastener with said legs in said recess to rotate on said washer.

2. An assembly as claimed in claim 1, in which a sheet of sealing material is fixed to the radial flange of said washer and spaced from said raised central portion of the washer, said flange having protuberances on its edge in engagement with said sealing material to retain said material in position and prevent rotation of the washer.

References Cited

UNITED STATES PATENTS

| | | | |
|---|---|---|---|
| 561,913 | 6/1896 | Paquette. | |
| 1,652,235 | 12/1927 | Bronson | 85—32 |
| 2,117,775 | 5/1938 | Tinnerman | 85—36 |
| 2,417,262 | 3/1947 | Morehouse | 85—36 |
| 2,561,036 | 7/1951 | Sodders | 85—36 |
| 2,775,917 | 1/1957 | Ferguson | 85—36 |
| 2,862,413 | 12/1958 | Knohl | 85—36 |
| 2,913,950 | 11/1959 | Tinnerman | 85—35 |
| 2,969,705 | 1/1961 | Becker | 85—36 |
| 2,981,651 | 4/1961 | Arnold | 151—38 |
| 2,986,059 | 5/1961 | Duffy et al. | |
| 3,075,272 | 1/1963 | Buyken. | |
| 3,164,055 | 1/1965 | Duffy. | |
| 3,345,899 | 10/1967 | Fiddler | 85—32 |

EDWARD C. ALLEN, Primary Examiner

U.S. Cl. X.R.

85—32, 50